UNITED STATES PATENT OFFICE.

JOHN E. WYNKOOP, OF POTTSVILLE, PENNSYLVANIA.

PROCESS OF MAKING AND COMPOSITION FOR PAVEMENTS, &c.

SPECIFICATION forming part of Letters Patent No. 325,718, dated September 8, 1885.

Application filed February 20, 1885. (Specimens.)

*To all whom it may concern:*

Be it known that I, JOHN E. WYNKOOP, a citizen of the United States of America, residing at Pottsville, in the county of Schuylkill and State of Pennsylvania, have invented a new and useful Improvement in Compositions for Pavements and other Purposes, which I term Cinderlithic Pavement or Composition, of which the following is a specification.

This invention relates to compositions for artificial stone especially adapted for sidewalks and other purposes—such as building-blocks and drain and water pipes—and to the art of making the same.

The principal object of this invention is to provide a pavement for sidewalks and other purposes combining the properties of economy and durability. This result is attained by utilizing a small proportion of cement in such a way and with such material, as hereinafter described, as to secure sufficient strength in the composition to resist the tendency to breakage or cracking or crumbling by expansion and contraction, thereby avoiding the necessity of separating the pavement into blocks by means of tar-paper or otherwise, and securing also a pavement which is water-proof. In making this composition I take slag or cinder, such as comes from blast-furnaces—or, in the absence of such slag or cinder, I take hard rock, flint, or stone—and granulate it into grains of determinate sizes from a two-inch cube to such as will pass through a No. 10 sieve. The granules of different sizes are carefully proportioned, so as to fill the voids when placed in the mold. This granulated furnace-slag is then mixed with Portland cement in the proportions of one part of cement to four parts of granulated slag such as will pass through a No. 4 sieve, to which is added four parts of sizes from a two-inch cube down to a one-inch cube, or thereabout, as the character of the work may require. This mixture of cement and furnace-slag in grains of regulated sizes is then dampened with lime-water containing a solution of adhesive material, and placed while in this dampened and comparatively dry, non-plastic state in the molds, care being taken that the granules are evenly distributed, and then the mass is subjected to a severe tamping until it is reduced to about one-third of its original bulk when placed in the mold, and then it is allowed to harden.

The liquid mixture for dampening the granulated slag may be composed of glue, three parts; starch, three parts; lime, three parts, and water, one hundred parts.

In laying artificial-stone pavements with this composition I proceed as follows: To form a section of the pavement, I lay down pieces of timber, called "racks" or "screeds," of suitable length and thickness, inclosing an area not to exceed more square feet than can be safely worked by two finishers at one time, or before the finishing layer becomes set—a space, say, about eight by twenty-four feet. The racks are rigidly fastened to the ground by pins, and constitute a mold for the composition. This mold is then filled flush with the surface-line of the pavement with the composition above described in a comparatively dry state. The composition is then subjected to a severe tamping with iron tamping-bars, which reduces it to one-third of its original thickness. The surface is then well scratched or scored to receive the finishing layer.

The finishing layer is composed of the following ingredients, in the determinate sizes and proportions set forth, namely: furnace-slag or sharp gravel, free from sand and dust, in grains that will pass through a sieve of from a one-half to a three-fourths inch mesh, in volume, say, three parts; furnace-slag or sharp gravel, free from sand and dust, in grains such as will pass through a sieve of from a one-fourth to a one half inch mesh in volume, say, three parts; furnace slag or cinder, or very sharp sand, in grains such as will pass through a No. 4 to a No. 8 sieve, say, four parts; total, ten parts. I take the last four parts of fine cinder or sand and add in volume four parts of the best Portland cement, and thoroughly incorporate the mass. I then add the six in volume of coarse cinder, and thoroughly mix it in a plastic state. The mold is then filled with this plastic mass, which forms the top layer. This layer is straight-edged and thoroughly floated and pressed in place by troweling with a steel trowel, which operation brings the water to the top. I then apply what I term "Wynkoop's Cinderlithic Drier," which is composed of granulated furnace-slag, such as will pass through a No. 8 sieve, perfectly free from powder and dust, mixed with Portland cement in the proportions of about four parts in volume of cement to three parts in volume of cinder. This compound is dusted over the top layer aforesaid, and, absorbing the moisture therefrom, acts as a drier and closes up the air-cells. This composition or drier is then thoroughly floated or rubbed onto the top layer, and when sufficiently set is smoothed with a steel trowel. By thus regulating the sizes and proportions of the materials I produce a pavement of great strength and considerable thickness with the use of a small quantity of cement. The particles of cinder, being coarse and free from sand, do not reduce or weaken the mortar, and their superficies being much less than that of the same quantity of material when finely pulverized, a small quantity of the mortar is sufficient to coat them and cement them together, and, being porous, the cement obtains a firm hold upon the particles. The different sizes are so proportioned and thoroughly distributed throughout the mass as to cause an intimate interlocking and binding or tying together of their angular and irregular bodies. Hence the pavement can be laid six inches in thickness at a small cost, so little cement being required, and, owing to its strength and thickness and the close interlocking and tying of the particles, it may be laid solid and undivided without danger of crumbling or cracking from expansion or contraction.

To avoid the necessity of taking up the pavement in case of leaks of water or gas pipes, I place beneath or through it, extending from the cellar or inner edge to the outside of the curbstone, eight-inch pipe, in which the water and gas pipes may be placed, and from which they may be readily withdrawn for repairs.

I am aware that the ingredients herein mentioned have heretofore been used in pavements, but not in regulated grains of the sizes and proportions herein stated. By thus regulating the sizes and proportions of the grains constituting the base of the composition I secure a strong pavement with the use of a very small proportion of cement. Hence a durable pavement can be produced cheaply which does not require to be divided into blocks in order to prevent breakage by contraction.

I claim as my invention and desire to secure by Letters Patent—

1. In a concrete pavement, a layer composed of furnace-slag, in grains about three-fourths of an inch in size, three parts, and furnace-slag, in grains of about one-half an inch in size, three parts, said grains being mixed with a mortar composed of fine slag or sharp sand, four parts, and Portland cement, four parts, substantially as described.

2. A pavement comprising an under layer composed of furnace-slag in grains of regulated sizes, as described, and Portland cement, in about the proportions set forth, dampened with lime-water containing adhesive matter, and the mass thoroughly tamped, and an upper layer composed of furnace-slag in grains of regulated sizes, as described, mixed in about the proportions set forth, with a mortar composed of fine furnace-slag or sharp sand and Portland cement, in about the proportions specified, substantially as described.

3. A cinderlithic drier for concrete pavements, composed of dry granulated furnace-slag and Portland cement, in substantially the proportions specified.

4. A cinderlithic drier for concrete pavements, composed of dry granulated furnace-slag and Portland cement, in substantially the proportions specified, sifted and floated upon the top layer of the pavement, substantially as described.

JOHN E. WYNKOOP.

Witnesses:
F. M. HIGHT,
GEO. NOBLE.